(12) United States Patent
Jokimies et al.

(10) Patent No.: US 6,526,267 B1
(45) Date of Patent: Feb. 25, 2003

(54) METHOD AND APPARATUS FOR DETECTING THE HOME AREA IN A MOBILE STATION

(75) Inventors: Matti Jokimies, Salo (FI); Timo Ali-Vehmas, Salo (FI); Juha Haltia, Kaarina (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/138,068

(22) Filed: Aug. 21, 1998

(30) Foreign Application Priority Data

Aug. 22, 1997 (FI) .................................................. 973456

(51) Int. Cl.[7] .......................... H04B 1/18; H04B 7/00; H04Q 7/20

(52) U.S. Cl. ................... 455/161.1; 455/422; 455/432; 455/428; 455/456; 455/515; 342/387; 342/465

(58) Field of Search ................................ 455/456, 422, 455/428, 457, 435, 551, 11.1, 410, 432, 423, 161.1, 515, 413, 426; 342/465, 387; 235/380

(56) References Cited

U.S. PATENT DOCUMENTS

| | | | | |
|---|---|---|---|---|
| 4,775,999 A | * | 10/1988 | Williams | 455/435 |
| 5,020,091 A | * | 5/1991 | Krolopp et al. | 455/551 |
| 5,259,018 A | * | 11/1993 | Grimmett et al. | 455/551 |
| 5,428,666 A | * | 6/1995 | Fyfe et al. | 455/551 |
| 5,444,765 A | | 8/1995 | Marui et al. | |
| 5,463,675 A | * | 10/1995 | Gerszberg | 455/551 |
| 5,471,643 A | | 11/1995 | Marui | 455/33.1 |
| 5,517,677 A | * | 5/1996 | Moon | 455/161.1 |
| 5,610,973 A | * | 3/1997 | Comer | 455/413 |
| 5,724,660 A | * | 3/1998 | Kauser et al. | 455/456 |
| 5,799,255 A | | 8/1998 | Berg et al. | 455/551 |
| 5,815,808 A | * | 9/1998 | Valentine | 455/422 |
| 5,839,051 A | * | 11/1998 | Grimmett et al. | 455/11.1 |
| 5,946,618 A | * | 8/1999 | Agre et al. | 455/428 |
| 5,978,669 A | * | 11/1999 | Sanmugam | 455/410 |
| 5,999,811 A | * | 12/1999 | Molne | 455/432 |
| 6,016,430 A | * | 1/2000 | Shinomiya | 455/515 |
| 6,091,362 A | * | 7/2000 | Stilp et al. | 342/465 |
| 6,098,878 A | * | 8/2000 | Dent et al. | 235/380 |
| 6,108,537 A | * | 8/2000 | Comer et al. | 455/426 |
| 6,148,198 A | * | 11/2000 | Anderson et al. | 455/432 |
| 6,266,013 B1 | * | 7/2001 | Stilp et al. | 342/387 |

FOREIGN PATENT DOCUMENTS

GB 034989 * 5/1989

OTHER PUBLICATIONS

Weib & Wizgall, "System 900:The ISDN Approach to Cellular Mobile Radio", Electrical Communication vol. 63, No. 4, 1989.*

Kerr, "Cellular Telephone Technology and Practice", Chapyers 1–3, 1994.*

* cited by examiner

Primary Examiner—William D Cumming
(74) Attorney, Agent, or Firm—Perman & Green, LLP

(57) ABSTRACT

The invention relates to a method for detecting a home area in a mobile station, and to a mobile station realizing the invention. According to the invention the home area is detected in the mobile station by comparing (8) data received by the mobile station from the base stations of a cellular network with predetermined (1 to 6) home area data stored in the mobile station. The home area data is determined (1 to 6) based on preferably all of the following data: a) a mobile country code (MCC), b) a mobile network code (MNC), c) a location area code (LAC) and a related cell identity (CI) for all broadcasting channels (BCCH) which the base station is able to receive, d) received signal strengths (RSS) for all broadcasting channels BCCH, e) distances from all base stations (BTS) on the broadcasting channels BCCH, and f) timing advances (TA).

10 Claims, 2 Drawing Sheets

METHOD AND APPARATUS FOR DETECTING THE HOME AREA IN A MOBILE STATION

BACKGROUND OF THE INVENTION

The object of the invention is a method defined in the preamble of claim 1 for detecting the home area in a mobile station, and a mobile station defined in the preamble of claim 9.

An aim is to establish that a mobile station is in its home area or in the area where it is mainly used in order to apply local call tariffs and local services.

From the patent publication EP 0 344 989 it is previously known a method to establish with the aid of a system identification number (SID) that a mobile station is in its home area. A mobile station according to the method has several identification numbers, of which it according to the SID selects one to be used. Thus the mobile station has several home areas, which it can detect with the aid of the SID it receives.

A problem of the known devices is that they are complex and expensive to realise.

The object of the invention is to obviate said disadvantages.

The method according to the invention is characterised by what is presented in claim 1. The mobile station according to the invention is characterised by what is presented in claim 9. Preferred embodiments of the invention are presented in the dependent claims.

The invention relates to a method for detecting the home area in a mobile station. According to the invention the home area is detected in the mobile station by comparing data received by the mobile station from base stations of the cellular network with predetermined home area data stored in the mobile station (LFP, Location FingerPrint).

In an application of the invention the home area data is determined based on at least part of the following data:

a) a mobile country code (MCC),
b) a mobile network code (MNC),
c) a location area code (LAC) and a related cell identity (CI) for all broadcasting channels (BCCH, Broadcast Control CHannel) which the mobile station is able to receive,
d) the received signal strengths (RSS) for all broadcasting channels BCCH,
e) the distance to all base stations (BTS, Base Transceiver Station) on the broadcasting channels BCCH, and
f) the timing advance (TA).

On the basis of the mobile station's country code, mobile network code and location area code it is unanimously known where the receivable base stations are located. Preferably, averaging is used in determining the signal strengths, distances and timing advance, so that abrupt changes caused by the terrain should not interfere with the measurement result. The base stations from which this data is received are preferably selected so that only a few of the most adjacent stations are used to determine the data. Thus the location is advantageously determined as accurately as possible. Preferably, as many as possible of the previously listed data a) to f) are used in determining the location of the mobile station. Preferably, at least three of the data a) to f) are used. However, the invention is not limited to using exactly the data a) to f) listed previously. In various embodiments of the invention, only a part of the data a) to f) may be used, or other data and measurements may be used in addition to the data a) to f) to increase the accuracy of the determination.

SUMMARY OF THE INVENTION

In one application of the invention said comparison method comprises the following steps:

a) the home area data is compared with the data received by the mobile station;
b) the mobile station is deduced to be within the home area if the data received by the mobile station is within predetermined tolerances when compared with the home area data, and in the opposite case the mobile station is deduced to be outside the home area;
c) the deduced result is presented to the user; and
d) if the mobile station is within the home area, this is reported to the operator.

In one application of the invention said home area data is determined by storing the corresponding data in the mobile station when it is within the home area.

In one application of the invention said home area data is determined by deduction based on the cellular network structure and stored in the mobile station.

In one application of the invention there can be several home areas to be determined and identified.

In one application of the invention the home area to be determined is the basis for a certain service.

The mobile station according to the invention comprises a processor to define the mobile station's home area data and to compare this data with the received data in order to detect the home area, a memory to store programs and home area data, an RF section to receive data and to send this data to a base station, a keyboard to activate definition of the home area, a display to present the home area comparison result, and a data bus for the data communication between the means.

An advantage of the invention is that the location of the mobile station is reliably detected. A further advantage is that no equipment changes are required due to the invention. Further, due to the invention the infrastructure of a cellular network does not have to participate when the location is determined. A service control point (SCP) in a cellular network controls call tariffs and services on the basis of the home location register (HLR). The database of the cellular network is situated in the home location register, which comprises permanent basic data of mobile subscribers registered in the network.

DESCRIPTION OF THE DRAWING

The invention is described in detail below with reference to the enclosed drawing, in which.

DETAILED DESCRIPTION OF THE INVENTION

Figure 1:
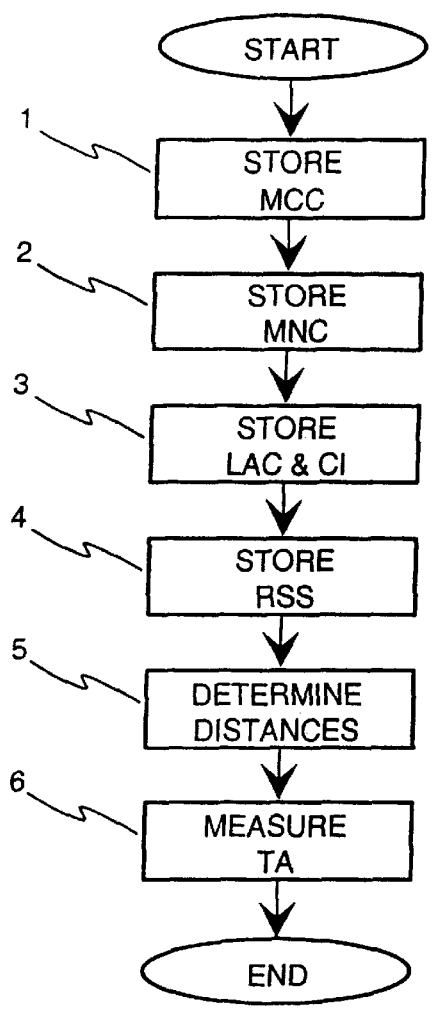
FIG. 1 shows in a flow chart a method according to the invention for generating home area data.

FIG. 1 shows as a block diagram the method according to the invention to generate home area data. In this application the home area data comprises the following data: the mobile country code, the mobile network code, the location area code and cell identity, signal strengths, the distances from the base stations, and the timing advance. The home area data is stored from the data received by the mobile station in the following method steps. In step 1 the mobile country code MCC is stored, which is a three digit code given to each country and used to identify the mobile subscriber's country of registration. Then in step 2 the mobile network code MNC is stored, which is the code identifying the mobile network. The location area code LAC and cell identity CI for all broadcasting channels BCCH which the mobile station is able to receive are stored in step 3. In step 4 the received signal strength RSS for each broadcasting channel BCCH is measured and stored. The distances to each base station BTS are determined and stored in step 5 by using the broadcasting channels BCCH. The timing advance TA is measured and stored in step 6 if the distance from the base station to the mobile station is 35 km or less. The timing advance TA means the estimated added two-way transit time delay. In the GSM system (Global System for Mobile communications) the timing advance is measured as bit modulation periods T having a length of 48/13 $\mu$s.

Alternatively the home area data is generated by deduction based on the cellular network structure, for instance so that the network operator generates the data.

Figure 2:
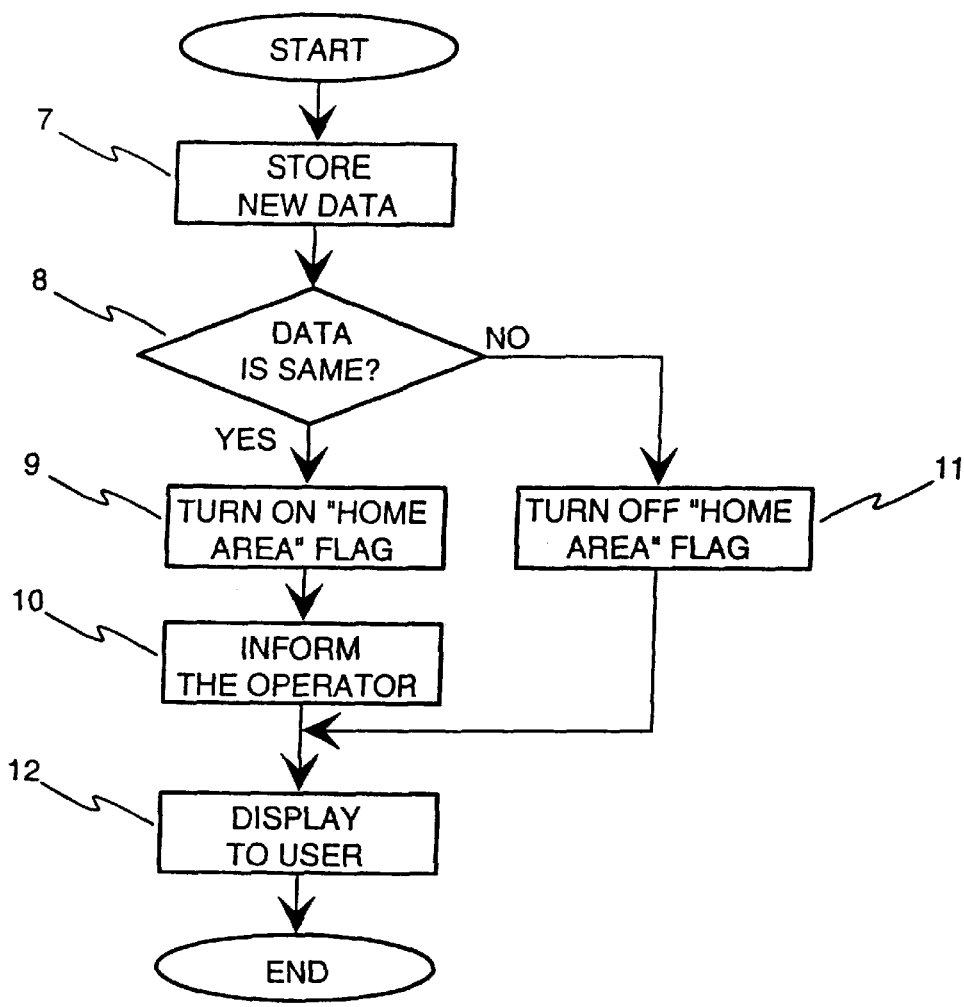
FIG. 2 shows a method according to the invention for detecting the home area by comparing with data which is received by the mobile station.

FIG. 2 shows a method according to the invention for detecting the home area by data comparison. New data received by the mobile station corresponding to the home area is stored in the first step 7. In the next step 8 all home area data is compared with the new data. A part of the data is in analogue form, such as the signal strength, so that their values are compared using certain tolerances. If the new data is within the tolerances, compared to the home area data, the operation continues at step 9, where it is determined that the mobile station is in the home area, and then at step 10 where the operator is informed of the result. The tariffs and services according to the home area are available when the operator has been informed of this. If the data was not within the tolerances in step 8 the operation continues at step 1, where it is determined that the mobile station is outside the home area. After the actual comparison step 8, and the following operations 9 and 10 or 11, the operation continues at step 12 where the result is indicated to the user.

Let's examine as an example how the mobile station's home area data is stored and how the mobile station moves outside the home area. The mobile station's user determines the central point of the home area by pushing a button on the mobile station or by making a call to a special service number. Alternatively the cellular network operator determines the central point of the home area by calling from the network to the mobile station and by using a particular signalling which is based on e.g. the short message service (SMS) or on the USSD signalling (Unstructured Supplementary Service Data). The mobile station stores at least the above mentioned data of the home area, that is the mobile country code, the mobile network code, the location area code and cell identity, signal strengths, the distances to the base stations, and the timing advance.

The above presented data to be stored forms the home area data, on the basis of which the mobile station later can identify its location. A confirmation message in the form of an SMS or USSD is transmitted to the operator when the home area data has been stored. If required the operator will confirm the use of local call tariffs and services.

At power-up and at the beginning of each call the mobile station checks its current location by comparing the data it receives with the home area definition data. The mobile station also reports to the cellular network whether the mobile station is within its home area. This is also indicated to the user by a message on the mobile station's display, by a photodiode and/or by a tone.

In some cases the mobile station's user can define his/her home area at a location which differs from the previous one, for instance due to changes in the cellular network. However, this is always reported to the operator, so that misuse of this feature is prevented.

The procedure used by the mobile station to detect the home area is substantially of the kind shown in FIG. 2.

During a call the timing advance TA and the signal strengths received by the mobile station from the neighbour base stations are monitored in order to know whether the mobile station still is within its home area. When it is observed that the mobile station moves outside its home area the mobile station first indicates this to the user and then turns off the "home area" flag (ref. FIG. 2) and reports this to the cellular network. A consequence of this is that call tariffs and services according to the home area are not anymore available. The call is continued or terminated, depending on the conditions in the contract with the operator.

Preferably the received signal strengths and the timing advance are averaged over a certain time, so that only long-term positive changes cause a home area decision. In addition to the data of the current cell data is preferably collected only from a certain neighbour cell or from certain neighbour cells which are best suited for the determination of the location. For instance those cells are used with the highest received signal strengths, and cells with signal strengths falling below a certain limit are ignored. If required, the received signal strengths are weighted for each cell, for instance on the basis of the distance of a certain single cell from the mobile station.

Figure 3:
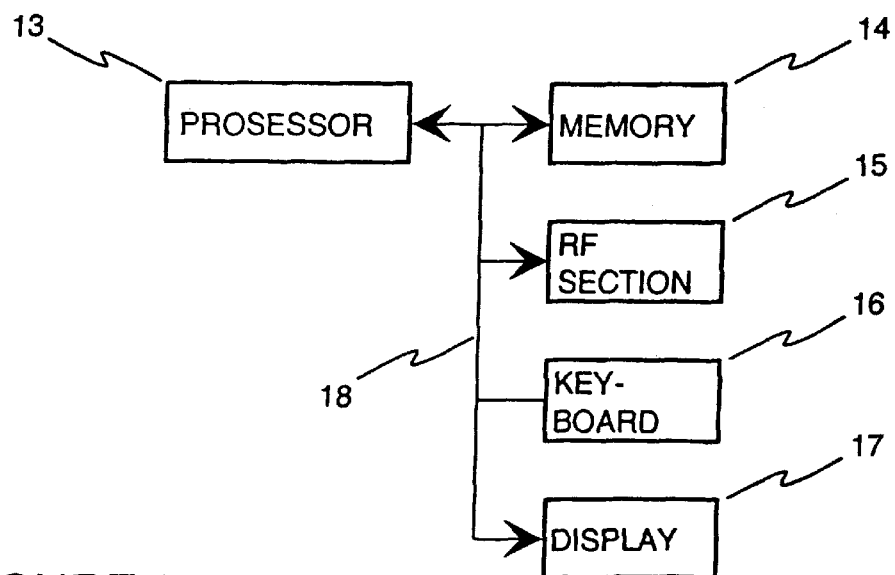
FIG. 3 shows in a block diagram essential sections of a mobile station according to the invention.

FIG. 3 shows as a block diagram certain functional blocks of the mobile station according to the invention. The block diagram shows a processor 13 for processing the home area data, a memory 14 for storing programs and the home area data, a radio frequency (RF) section 15 for transmitting and receiving the home area data, a keyboard 16 for initiating the definition of the home area data, a display 17 for presenting the result, and a data bus 18 for realising the communication between the blocks.

Figure 4:
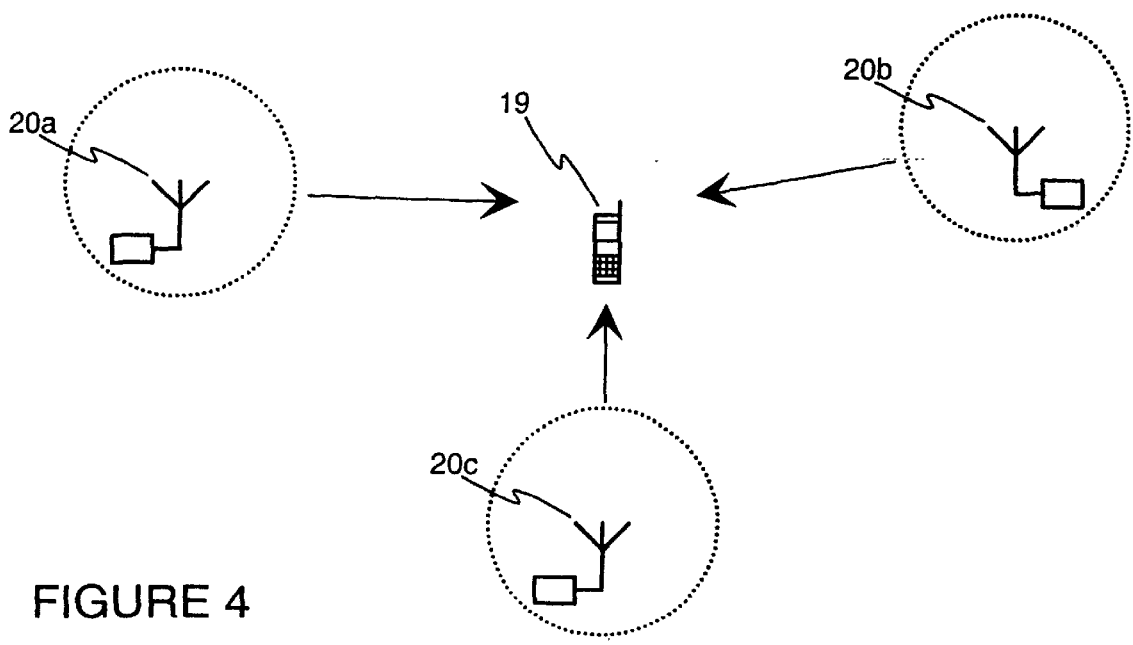
FIG. 4 shows the method according to the invention in a basic figure.

FIG. 4 shows a basic figure of the method according to the invention in a map-like presentation. The mobile station 19 receives radio transmissions from the base stations 20a, 20b, 20c. The radio transmissions contain the coded home area data mentioned above, which are stored. At the same time the mobile station 19 determines the distances to the base stations 20a, 20b, 20c from the mobile station 19 on the basis of the received radio transmissions.

In order to ensure a utilisation according to the contract a cellular network uses an administrative process which collects statistics about the home area settings made in the mobile station. The utilisation is according to the contract when the home area is always defined to be the same.

The home area must be redefined when the operator of the mobile network changes the network structure. This is indicated to the user. The user can again use his/her home area features when he has made the redefinition. The definition is alternatively made automatically by data transmitted from the network to the mobile station.

In addition to the absolute quantities mentioned above, or instead of these quantities, the home area can be determined using relative quantities relating to the base stations. Preferably the difference of the RSS levels of different base stations is then used as a criterion. The observed time difference (OTD) of the signals received from the base stations is also used, if the time difference method is used in the mobile network.

The home area data is alternatively used in the mobile station only to adapt the mobile station's own functions to the home area in accordance with the requirements of the device or the user.

In the above presented example the operation of the method according to the invention is described in a GSM mobile system, but the system can also be some other common mobile PLMN network (Public Land Mobile Network).

The invention is not limited to concern only the above presented embodiment examples, but a plurality of modifications are possible within the inventive idea defined in the claims.

What is claimed is:

1. A method for detecting a home area in a mobile station comprising the steps of:

storing predetermined home area data in the mobile station;

receiving data by the mobile station from base stations of a cellular network;

comparing said data received by said mobile station to said predetermined home area data to determine if said mobile station is within said home area; and wherein said home area data is determined based on at least part of received data comprising signal strengths of available broadcasting channels, distances to base stations on the broadcasting channels, and time advances.

2. A method for detecting a home area in a mobile station, according to claim 1, wherein said home area data is further based on at least part of received data comprising mobile country code, mobile network code, a location area code, and related cell identities for all broadcasting channels which the mobile station is able to receive.

3. A method for detecting a home area in a mobile station, according to claim 1, wherein said step of comparing determines if said detected data is within predetermined tolerances of said stored data.

4. A method for detecting a home area in a mobile station, according to claim 1, wherein said home area data is received and saved in said mobile station when said mobile station is in said home area.

5. A method for detecting a home area in a mobile station, according to claim 1, wherein said home area data is determined based on cellular network structure.

6. A method for detecting a home area in a mobile station, according to claim 1, wherein said home area data is received automatically from said mobile communications network.

7. A method for detecting a home area in a mobile station, according to claim 1, wherein said home area data includes defining data for a plurality of home areas.

8. A method for detecting a home area in a mobile station, according to claim 1, wherein location in said home area determines the availability of a certain service.

9. A mobile station equipped to detect home area data comprising:

a storage medium for storing predetermined home area data;

a radio receiver for receiving home area data from base stations of a cellular network;

a processor for comparing said data received by said mobile station to said predetermined home area data to determine if said mobile station is within said home area; and wherein said home area data is determined based on at least part of received data comprising signal strengths of available broadcasting channels, distances to base stations on the broadcasting channels, and time advances.

10. A mobile station equipped to detect home area data, according to claim 9, wherein said home area data is further based on at least part of received data comprising mobile country code, mobile network code, a location area code, and related cell identities for all broadcasting channels which the mobile station is able to receive.

* * * * *